March 27, 1928. 1,663,744

H. A. ZIOLA

PORTABLE ELECTRIC COOKER

Filed Nov. 20, 1925 3 Sheets-Sheet 2

Inventor
H. A. Ziola
By Robb, Robb & Hill
Attorneys

March 27, 1928.
H. A. ZIOLA
1,663,744
PORTABLE ELECTRIC COOKER
Filed Nov. 20, 1925
3 Sheets-Sheet 3
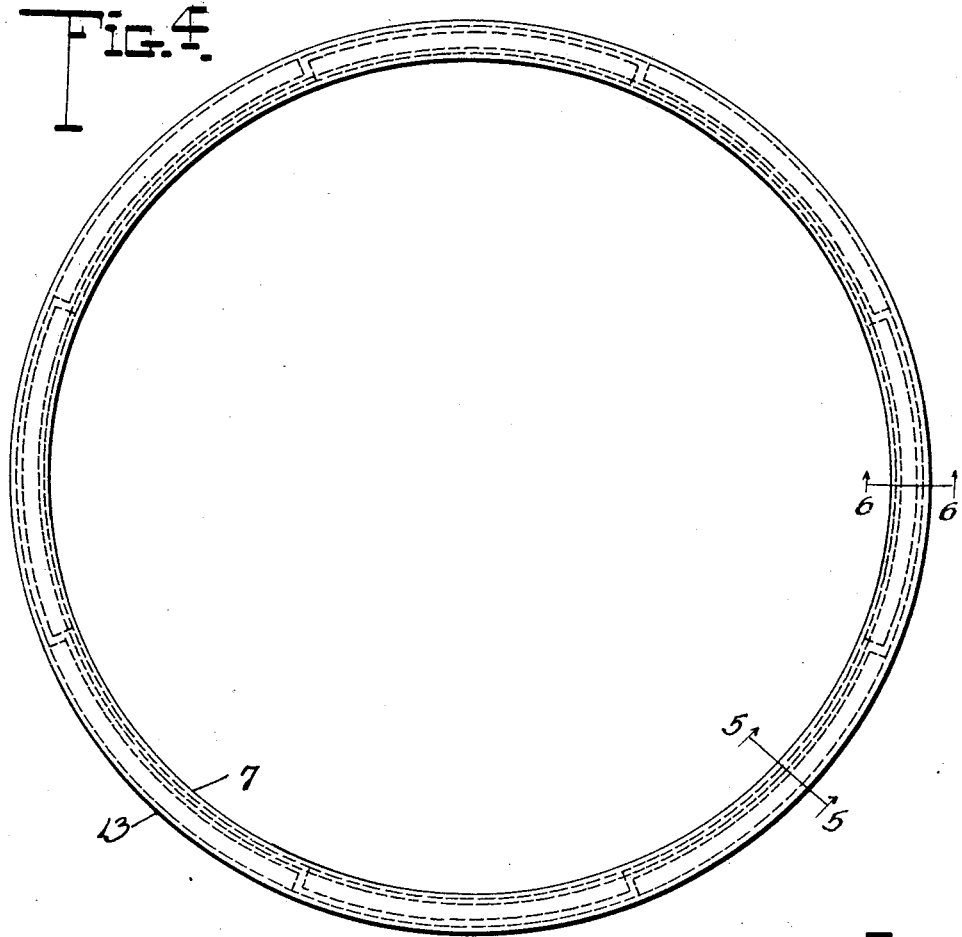
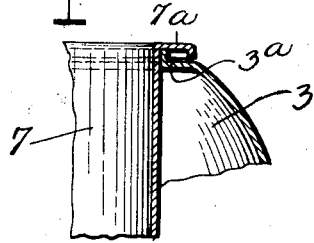 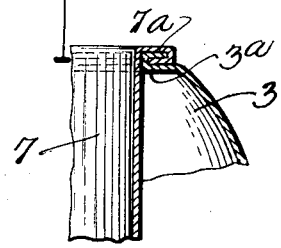 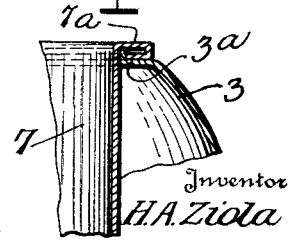
Inventor
H. A. Ziola
By Robb, Robb & Hill
Attorneys Patented Mar. 27, 1928.

1,663,744

UNITED STATES PATENT OFFICE.

HENRY A. ZIOLA, OF TOLEDO, OHIO, ASSIGNOR TO THE SWARTZBAUGH MANUFACTURING COMPANY, OF TOLEDO, OHIO, A CORPORATION.

PORTABLE ELECTRIC COOKER.

Application filed November 20, 1925. Serial No. 70,400.

This invention has to do with the art of electric cookers, so called, and among the objects thereof, is the provision of a construction of cooker which is much simplified from a manufacturing standpoint involving a sectional formation of casing permitting of separation of parts of the casing under certain conditions, and allowing for manufacturing operations that are not permissible in types of these cookers at present in use. For instance, it is desirable in cookers of the type referred to, from the viewpoint of a highly finished manufactured product, to enamel certain casing parts such as the top and bottom portions, the body of the casing usually being nickeled or otherwise specially finished. I have heretofore, designed cookers wherein the various parts of the casing are pressed together by machinery or otherwise connected by machine operations, but such cookers cannot be provided with fully enameled top and bottom sections, because the machine operations chip off the enamel. In my present construction of cooker, which is sectional as previously suggested, I provide means for connecting the several sections of the casing by hand tools in the factory, after the desired finishes, such as enameling, or nickel-plating have been applied to the casing parts. So far as the user of the cooker is concerned, the casing members are practically permanently connected, for when once assembled there is no occasion for the separation by the user. However, should they be returned to the factory, by the employment of proper tools, owing to the peculiar connecting means between the casing sections, a separation of the latter may be effected for purposes of repair, removal of dents, or access to parts enclosed by the casing. By reason of my peculiar means of connecting the casing parts, the expense of assembling said parts to make the finished article is reduced, in addition to my being enabled to apply high grade finishing coatings or coverings to the metal parts of which the casing consists, without liability of damaging the same in the assembly operation.

Still another object of my invention has been the provision of a special top section for the cooker made of a metal which is a poor conductor of heat in conjunction with the casing well, which is the heating portion of the cooker, which is preferably made of aluminum or a metal that is an excellent conductor of heat. Under these conditions my cooker which is designed for home cooking purposes by electric socket connections, is of increased advantage as the top portion of the casing does not become excessively hot, tending to burn the user who does not exercise foresight.

Other specific features of my invention will appear more fully upon reference to the following description, and the accompanying drawings, in which:

Figure 4, is a top plan view of the upper end of the top section of the casing and the upper end of the well of the casing showing the peculiar cut-a-way portion thereof, whereby they are interlocked together.

Figure 1:
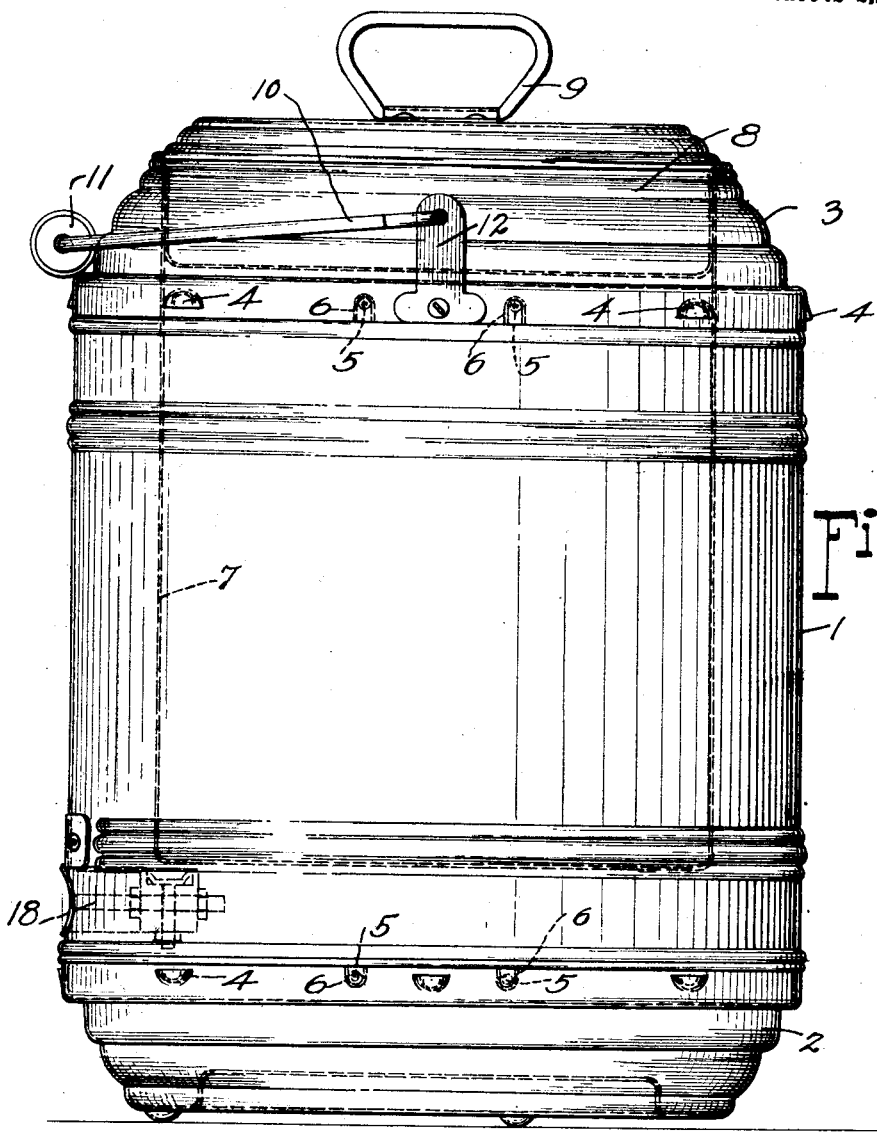
Figure 1, is a side elevation of an electric type cooker embodying a preferred form of my invention.

Figures 5 and 6, are sectional views on the lines 5—5 and 6—6 of Figure 4, and Figure 7, is a similar sectional view to Figures 5 and 6, all of which bring out the interlocking flange feature between the top casing section and top of the well therein.

In the carrying out of my invention I utilize a cooker body consisting of an outer casing 1 having a separate bottom section 2 and a separate top section 3. The sections 2 and 3 of the casing 1 are detachably connected therewith by fastening means designated at 4, these fastening means comprising pressed out projections providing snap catches enabling the sections 2 and 3 to be pressed over the lower and upper ends respectively of the body of the casing 1 and interlocked by means of said fastening projections 4 so that for all practical purposes the casing structure is united to provide a single body the parts of which will remain assembled, unless for some reason or other it may be desired to return them to the manufacturer and separate them to enable access to be had to interior parts of the cooker.

If desired, the parts 1, 2 and 3, may be provided at their overlapping portions, which are interlocked by the fastening means 4, with small projections 5 and guides 6 which facilitate the proper engagement or assemblage of the parts 1, 2 and 3.

The top section 3 of the casing 1 is used to connect with and support the cooking well 7 which consists of a casing like body arranged within the main casing 1 with its sides spaced from the sides of the latter and its bottom spaced from the bottom section 2 thereof as well. Preferably, the cooking well 7 is attached at its upper end to the upper end portion of the casing section 3 by peculiar means now to be set forth.

Figures 4 to 7 inclusive, are now referred to. From these figures it will be seen that the top of the well 7 is formed with an outstanding flange 7$^a$, and the top of the casing section 3 is formed with an instanding and outwardly re-bent flange 3$^a$. The flange 7$^a$ of the well 7 is inwardly re-bent in a direction opposite to the re-bend of the section 3. The re-bent portions of the flanges 3$^a$ and 7$^a$ are adapted to interlock. The interlock is established by providing on said flanges cut-a-way portions enabling them to be inter-engaged by revolution of the section 3 relatively to the well 7. It is contemplated that this interlock established between the parts 3 and 7 shall be a pretty tight connection effected by the use of proper hand tools in the factory. The connection is such that the parts 7 and 3 are practically permanently united so far as the said interlocking connection may concern the user, and said parts would only be separated if the cooker is returned to the manufacturer. The foregoing is also true in respect to the snap-fastenings 4 as previously suggested by the use of the latter. In connection with the parts 3$^a$ and 7$^a$, the various sections or members of the casing may be properly finished with a high grade enamel, burnt on if desired, and then assembled by joining the parts 3 and 7, pressing the part 3 down upon the casing body 1, suitably connected upon the resistance wire connections, and then pressing the bottom section 2 onto the body part 1 of the casing. The quickness with which the assembly can be made will be readily appreciated.

Fitting in the upper portion of the well 7 is a cover or top 8 having a handle 9. If the cooker is intended to be portable to the extent that it may be readily carried from one place to another, a bail 10 and handle 11 thereon will be provided, attached to suitable brackets 12 permanently applied to the casing section 3 in any suitable manner.

Figure 2:
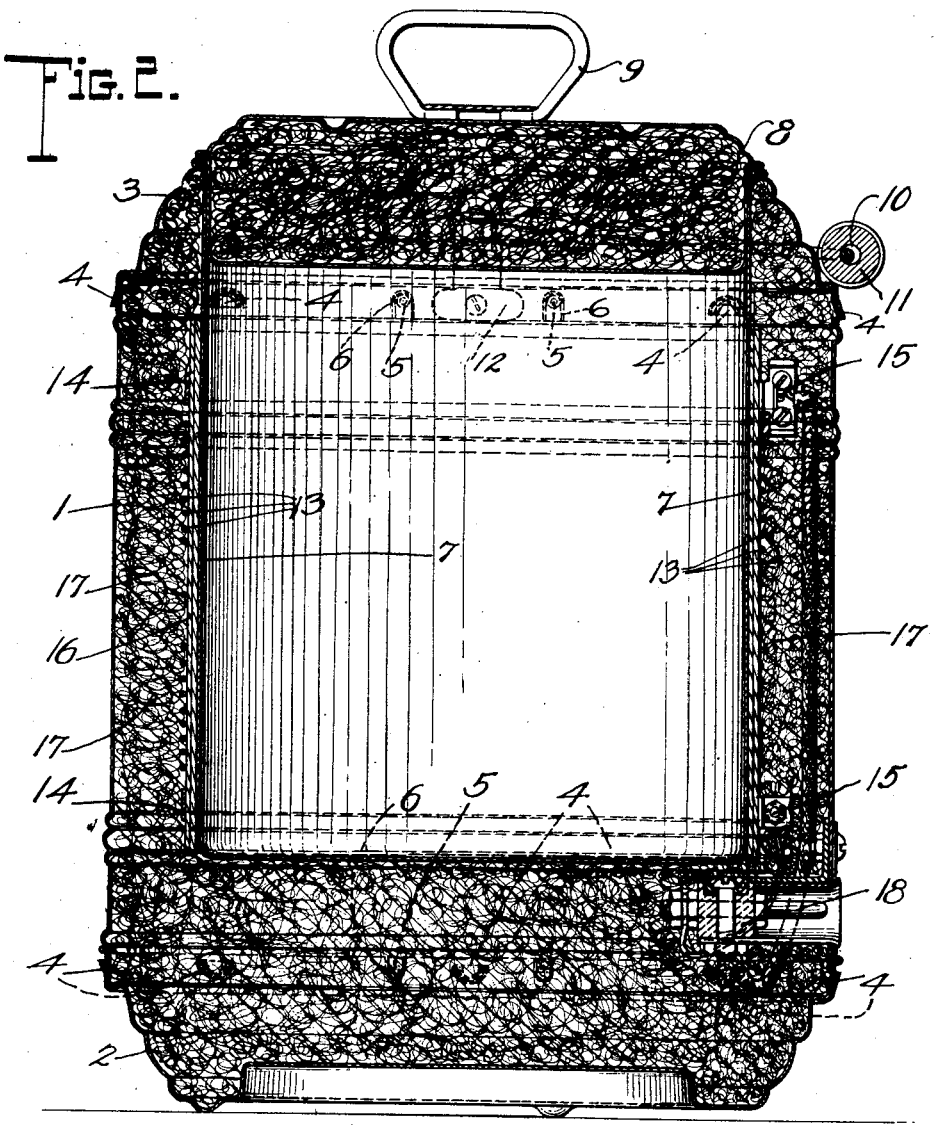
Figure 2, is sectional view of the same.
Figure 3:
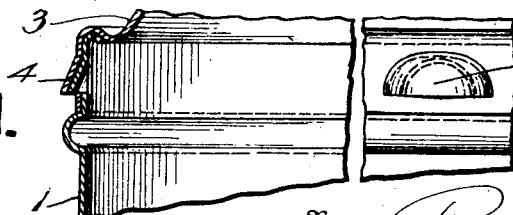
Figure 3, is a fragmentary view, partly in elevation and partly in section, showing the special snap fastening means employed in connecting the top and bottom section of the cooker to the body section of the casing.

The electric heating means used by me comprises a heating element in the form of resistance wire 13 which is wound so as to encircle the cooking well 7 with its windings as shown best in Figure 2. At the central portion of the well 7 the windings of the heating element 13 are spaced a considerable distance which may be empirically determined in the manufacture of cookers of different kinds and sizes, the purpose of this spacing being to prevent the creation of concentrated heat at the center of the cooking well due to the reduced radiation of the heat at this point of the heating appliance. The resistance wire or heating element 13 is secured to the well 7 by metal bands 14 at the upper and lower portions of the well, the ends of these bands being attached together by suitable bolts 15 providing terminal elements to which the wire of the heating element may be attached. The manner of applying the heating wire 13 to the well 7 forms the basis of a separate application for patent.

An important feature of the invention resides in my method of applying the heating element 13 to the cooking well 7 so that the windings of the wire are positively maintained in spaced relation, so that the heat generated by a passage of electric current through the wire is effectively distributed over the outer surface of the well for action upon food or other contents of the well when it is used as a cooker. To this end I pack in the space between the heating element 13 and the casing 1 with its sections 2 and 3, heat insulating mineral wool designated 17, precaution being taken to firmly pack the wool in between and around the turns of the heating element which encircle the well 7. In this way said turns are held tightly in place upon the well against shifting one into contact with the other with resultant obvious advantages readily to be understood by those versed in this art.

I do not deem it necessary to describe in particular detail the terminal connections which lead from the ends of the heating element 13 to a terminal socket 18 in which a suitable terminal plug connected with main line electric current may be inserted for supplying said current to the element 13.

My appliance is, of course, susceptible of considerable utility as a cold chamber for freezing of fluids, as well as for cooking purposes, after the known manner in this art. Furthermore, when my invention is made for house use it may be mounted in single or a plurality of units upon a base with or without legs, as desired. In the construction of Figure 1 the bottom section 2 of the casing is produced with hollow feet which space the main portion of the bottom from the support upon which it may be mounted.

Having thus described my invention, what I claim as new, and desire to protect by Letters Patent of the United States, is:—

1. In an appliance of the class described, in combination, an outer casing having an upper section connected thereto, a well detachably connected with said section and depending within the casing, an insulating covering surrounding the well, a heating element wound upon said covering, a packing insulation interposed between the well and insulating covering in contact with the coils of the heating element to maintain the coils in spaced relation, and a bottom section secured to the outer casing.

2. In an appliance of the class described, in combination, an outer casing comprising a removable bottom section, a cooking well supported from the top of said casing by interlocked sectional flanges upon the well and casing to permit the direct withdrawal of the well when said flanges are disengaged, and electric heating means supported by and surrounding the well between it and the casing.

3. A cooker casing and well assembly comprising a casing body, a top section for said body, a bottom section for said body, interlocking tongue and recesses between the top and bottom section and the body, and a well closed at its bottom and supported by the top section in a position spaced from the bottom of the body.

4. A cooker casing and well assembly comprising a casing body, a top section for said body having a supporting flange, a bottom section for said body, interlocking members provided upon the top and bottom sections and the body, and a well carried by the top section spaced from the base of the body and having a flange detachably interlocked with the supporting flange of said top section.

5. A cooker casing and well assembly comprising a casing body, a top section for said body of low heat conductivity, a bottom section for said body, interlocking members provided upon the top and bottom sections and the body, a well of higher heat conductivity carried by the top section and spaced from the body, a heating coil supported upon the outer surface of the well, and an insulating packing within the casing in contact with said coil and extending between the windings thereof.

6. An electric cooker casing and well assembly, consisting of a casing body, a top section therefor, a bottom section therefor, a well carried by the top section in spaced relation to the body of the casing, sectional interlocking flange sections upon the well and top section, and detachable tongue and recess connections between the casing body and the top and bottom sections permitting of relatively quick assembly and interconnection of said parts.

In testimony whereof I affix my signature.

HENRY A. ZIOLA.